United States Patent [19]
Ranalli

[11] Patent Number: 5,556,683
[45] Date of Patent: Sep. 17, 1996

[54] PROTECTIVE PLASTIC LAMINATES AND METHOD OF MANUFACTURING LAMINATED PROTECTIVE PLASTIC SLEEVES

[75] Inventor: Anthony G. Ranalli, Park Ridge, Ill.

[73] Assignee: C-Line Products, Inc., Des Plaines, Ill.

[21] Appl. No.: 326,485

[22] Filed: Oct. 20, 1994

Related U.S. Application Data

[63] Continuation-in-part of Ser. No. 253,684, Jun. 2, 1994.

[51] Int. Cl.$^6$ ........................................ B32B 9/00
[52] U.S. Cl. .............................. 428/76; 428/68; 428/92; 428/190; 428/200; 428/349; 428/913; 206/311; 206/312; 206/313
[58] Field of Search .............................. 428/192, 913, 428/67, 99, 76, 68, 92, 97, 200, 349, 190, 424.4; 206/45.34, 311, 312, 313, 387

[56] References Cited

U.S. PATENT DOCUMENTS

| | | | |
|---|---|---|---|
| 4,540,414 | 9/1985 | Wishman | 604/378 |
| 4,850,731 | 7/1989 | Youngs | 402/79 |
| 4,865,890 | 9/1989 | Erlichman | 428/35.1 |
| 5,211,287 | 5/1993 | Weisburn et al. | 206/387 |
| 5,238,107 | 8/1993 | Kownacki | 206/310 |

*Primary Examiner*—Patrick Ryan
*Assistant Examiner*—Abraham Bahta
*Attorney, Agent, or Firm*—David C. Brezina; Lee, Mann, Smith, McWilliams, Sweeney & Ohlson

[57] ABSTRACT

Laminated protective plastic sleeves are formed with an inner fuzzy layer laminated from a fuzzy surface sheet homogenous plastic substrate with an intermediate adhesive layer. The fuzzy laminate is then formed into a finished protective sleeve by shaping front and back plastic sheet laminations to hold a protected item identifying matter and descriptive matter, the finished layers being heat-welded and the finished sleeve being finally cut and shaped to the desired configuration.

10 Claims, 13 Drawing Sheets

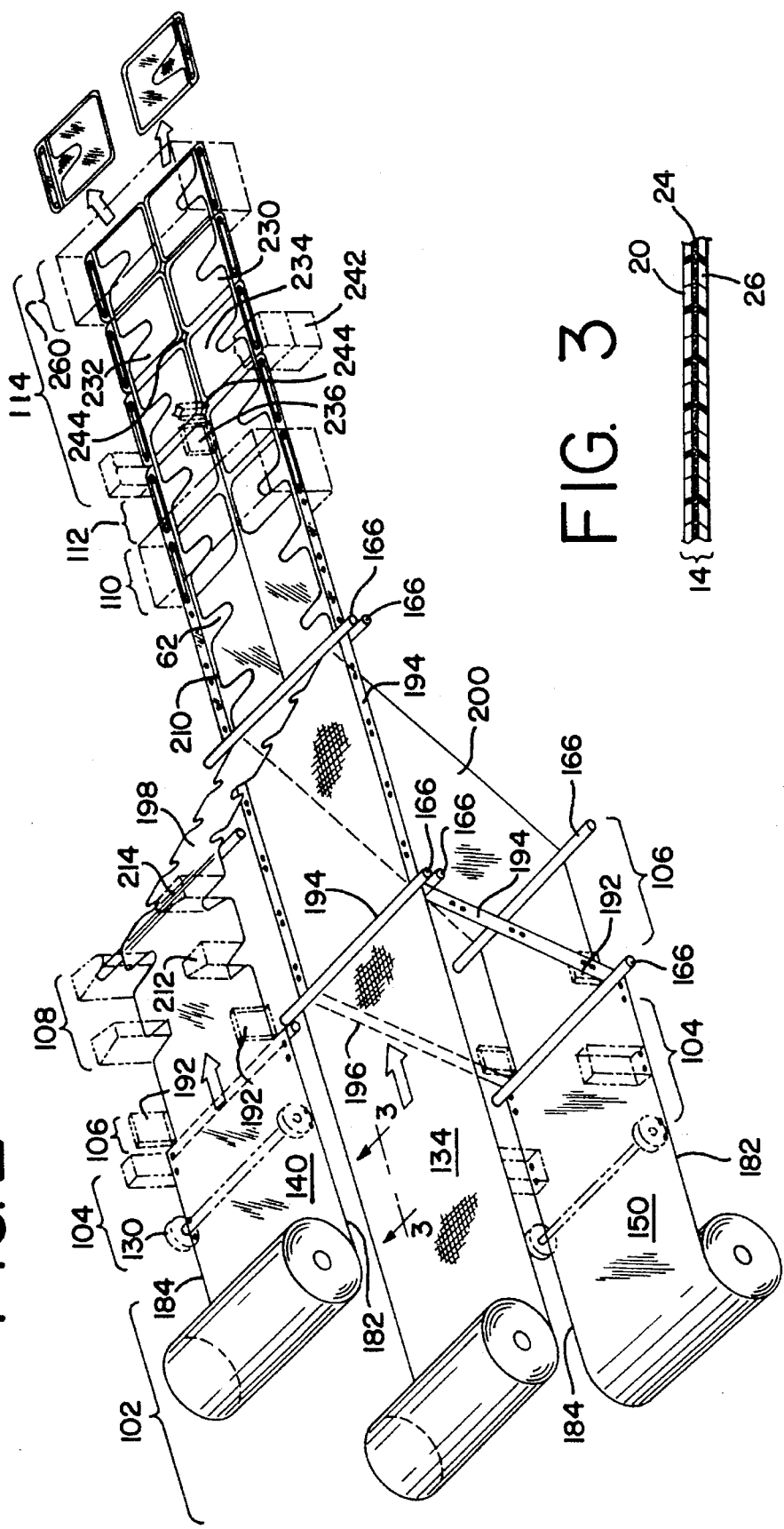

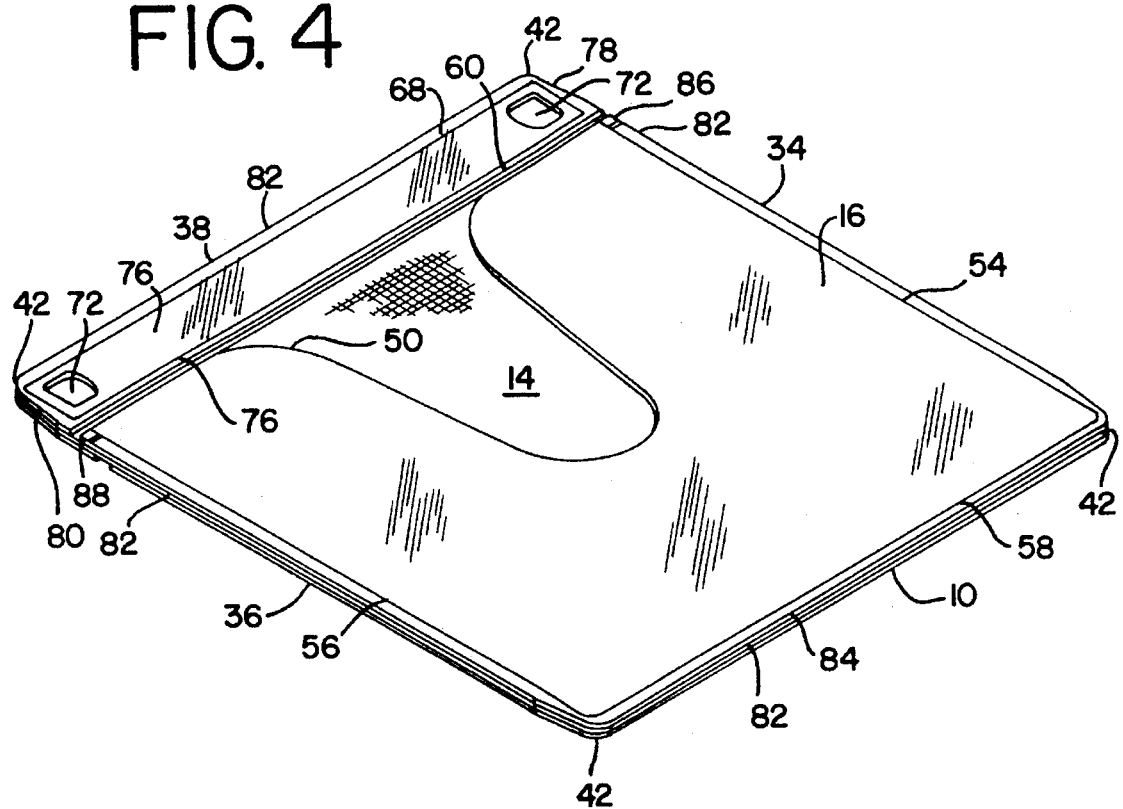
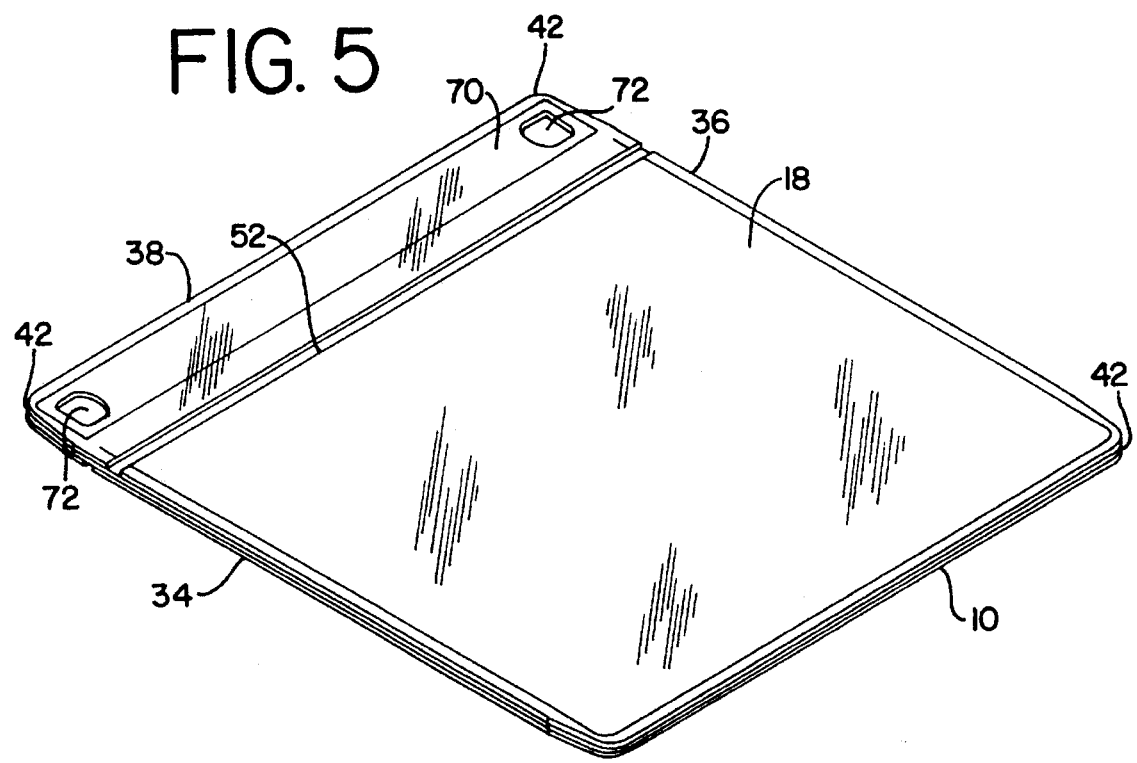

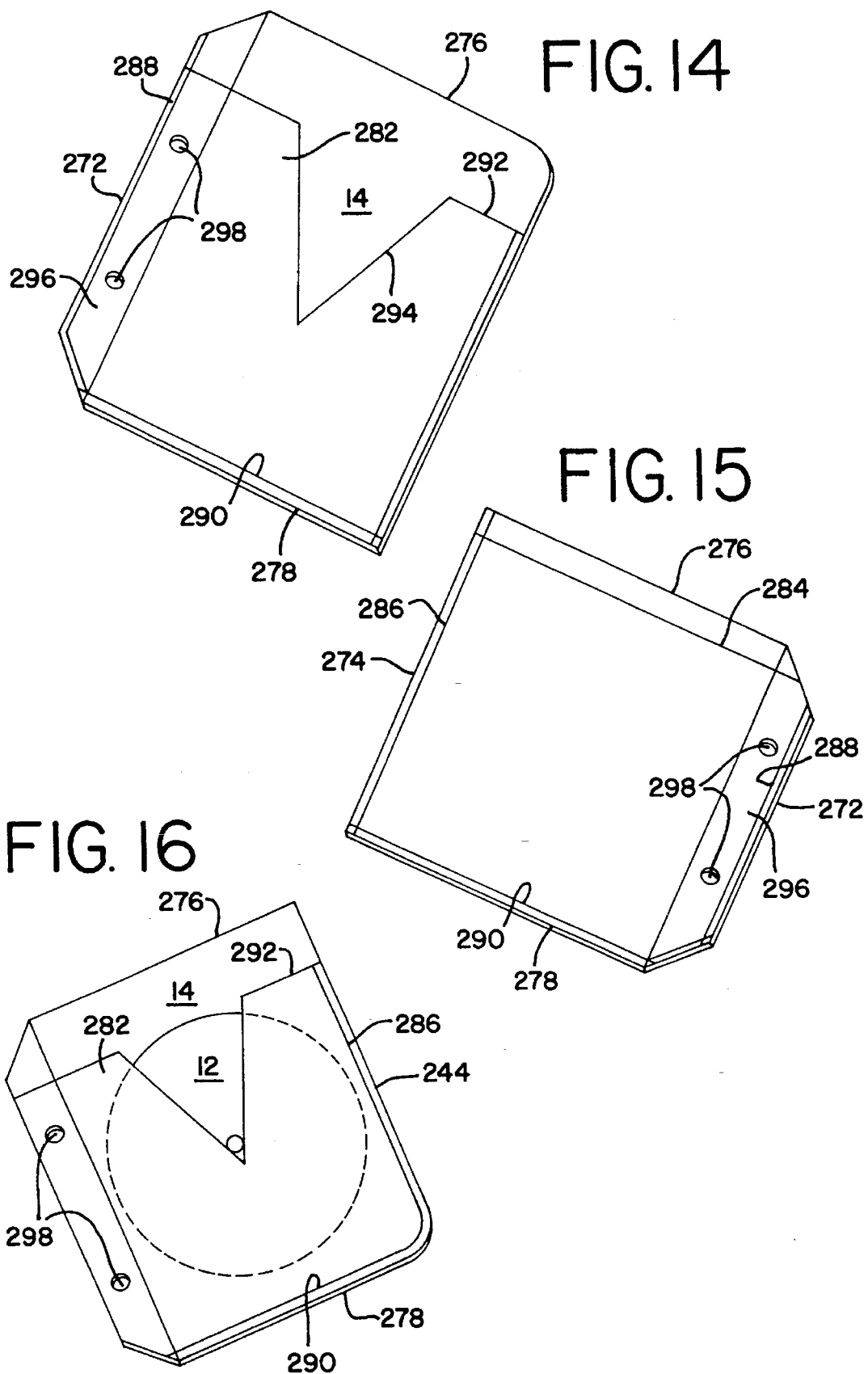

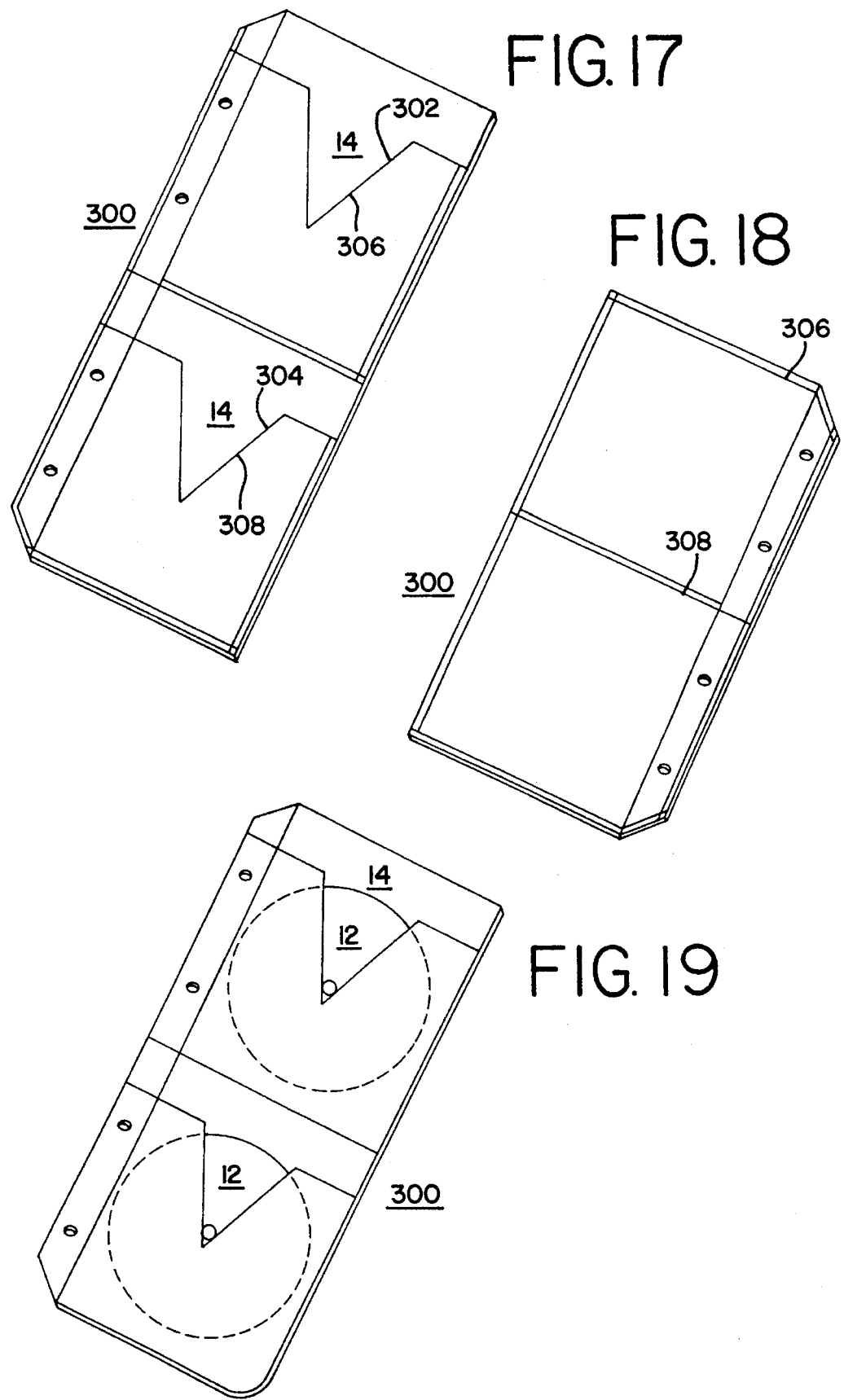

PROTECTIVE PLASTIC LAMINATES AND METHOD OF MANUFACTURING LAMINATED PROTECTIVE PLASTIC SLEEVES

RELATED APPLICATIONS

This application is a continuation-in-part of U.S. patent application Ser. No. 08/253,684, filed Jun. 2, 1994.

FIELD OF THE INVENTION

The invention relates to protective sleeves for flat, delicate items such as compact disks, the protective sleeve having a protective fuzzy lamination for contact with a protected surface of the item and front and back laminations formed and arranged to hold the item, identifying matter and descriptive matter, the laminations comprising plastic materials having stability under an improved range of ambient heat conditions and over time, having improved chemical stability, particularly in contact with the item and matter contained therein while being efficient and economical to produce.

BACKGROUND OF THE INVENTION

Modern recording media, such as compact disks and, to a lesser degree, traditional audio recording, molded in plastic, have surfaces the integrity of which are important to the quality of reproducing the matter recorded. Other items, such as photographic transparencies, also typically have sensitized surfaces, the integrity of which is important for the reproduction of the matter recorded thereon. Thus, scratches or contamination from dust, oils from the fingers, spills, and the like, are to be avoided.

Sleeves and holders of one kind or another have been developed from various materials having a variety of properties ranging from simple paper envelopes for phonograph records and transparent plastic sheet protectors and holders for documents and photographic slides.

In particular, sleeves for holding compact disks comprised of sheet material are known to provide alternatives to bulky, hard plastic boxes. Particularly in the audio compact disk field, it is desirable to have a sleeve or pocket to hold the compact disk or item, separate pockets to hold labels or other identifying matter, and an additional pocket to hold notes, lists, photographs or lyrics, which are customarily provided in the contemporaneous marketing environment of audio compact disks. Similar considerations would apply to compact disks for computer-readable information label or identifying matter and documentation being important.

U.S. Pat. No. 4,850,731 describes one alternative, although the specific elements therein are different from the preferred embodiment. In the commercial embodiments of compact disk sleeves, various materials and geometries have been used which have been determined to have drawbacks in their performance of the desired functions.

For example, certain sheet materials, such as vinyl (polyvinyl chloride) have disadvantages in their physical and chemical stability under a variety of conditions. One hypothetical is, for example, the storage of compact disks, such as in an automobile parked in the sun wherein relatively high ambient temperatures can be achieved, high enough for vinyl to soften considerably and potentially melt around the compact disk. Another drawback to vinyl is that it tends to become brittle over time at a relatively rapid rate as compared with the life of the compact disk itself. Another disadvantage is that vinyl and, to a lesser degree, certain other sheet materials, in part to combat the brittleness tendency, include levels of chemical plasticizers that adversely affect materials stored therein. For example, certain inks and toners applied on paper can be partially lifted therefrom by contact with a vinyl surface. Polyethylene has somewhat greater stability in these areas than vinyl; however, is somewhat costly and somewhat more difficult to manufacture having other desirable physical properties such as the fuzzy contact with the optical surface of a compact disk.

The method of the invention uses polypropylene formed and arranged to maximize the properties of stability and yet further provide for an efficient and economical method of manufacture yielding a superior and more economical finished product.

SUMMARY OF THE INVENTION

The invention relates to a protective plastic sleeve for the storage of recorded media, primarily compact disks, having an inner fuzzy lamination and front and back sheets providing certain characteristics. The inner fuzzy lamination is formed from a fuzzy surface sheet having desirable properties for contacting the protected surface, particularly the optical surface of a compact disk. This fuzzy surface sheet is formed in the preferred embodiment from thermally bonded white non-woven polypropylene fabric which is sufficiently soft and has a surface finish flexible such as to not scratch the optical surface of a typical disk. Because of the extended nature and the soft flexible physical properties of the fuzzy sheet, improved durability and strength is added by laminating, with an intermediate white extruded adhesive layer, to a cast clear polypropylene film. Thus, the entire inner fuzzy lamination comprises in the preferred embodiment a 1.1 oz. per square yard thermal bonded polypropylene fabric laminated using 7 lbs. per ream of extended white polypropylene film laminated to a 0.0025 inch clear cast polypropylene film.

This method of forming and physical arrangement of the inner fuzzy lamination not only has the desired finished properties for protecting the compact disk, but also remains soft and fuzzy throughout the manufacturing process from which the completely finished sleeve is formed, can be readily thermally welded so as to form an economical, durable, protective sleeve.

The inner fuzzy lamination can be formed directly on site and fed into the manufacturing line, or can be manufactured separately and stored for use in the final assembly line, as it is in the preferred embodiment. While the steps can be performed separately in time, all are considered elements of the invention.

Subsequent to the step of forming the inner fuzzy lamination into a continuous web, that lamination is located in a position to be joined to the other sheets. A front plastic sheet is formed of preferably 3.5 mil. matte polypropylene. This is a standard sheet familiar to persons of ordinary skill in the sheet forming art. The back sheet in the preferred embodiment also comprises standard 3.5 mil. matte finish polypropylene sheet. Thus, the front layer is located for continuous feeding, the inner lamination is located and positioned thereunder, and the third rear sheet located and positioned in turn under the first two. As will be seen, where the front sheet is imprinted, it is preferable for it to be located on the top, for ease of readability of printed matter; however, a suitable product could be formed "upside down" with the front sheet on the bottom and the rear sheet on the top in the assembly operation. The key is that the web forming the front sheet is fed, the web forming the rear sheet is fed with the inner fuzzy lamination therebetween. In a first embodiment, the webs can be arranged in automated splicing arrangement so that a plurality of rolls can be placed and automatically spliced so as to provide for uninterrupted operation.

The webs pass through web guidance stations where they are located in proximity in their desired relative positions, but having separation sufficient to accommodate the additional operations described below.

In the first embodiment, pockets for placement of identifying material such as labels to identify the contents of the compact disk are provided. These are substantially long, narrow pockets formed in the front and rear sheets, sealed or welded around their perimeter, but having access apertures in which a label, such as a paper or cardboard stock, can be inserted. While slip pockets are not novel in and of themselves, the approach of forming the slip pocket access herein provides a novel approach. Access to the slip pockets is provided through a plurality of opposed "D-shaped" apertures. The shape provides both ease of insertion, which could also be provided by a simple slit, but also for ease of manual extraction for correction, changing, replacement, or the like. The D-shape provides for substantial friction between the user's fingertip and the surface of the label, avoiding the need for tools, or other difficult methods of removal of the identifying matter or label.

The second step in the method of making the first embodiment is to die-cut the D-shaped apertures. As will be seen, this step is optional. In the first embodiment, both the front and rear sheets are die-cut near the top edge thereof in this step. They are each maintained separate from the inner fuzzy lamination because the inner fuzzy lamination defines two pockets, one on the front and one on the rear, thereby easing insertion, the identifying matter being placed against the inner fuzzy lamination for insertion, and also defining two separate pockets so labels could be separately inserted front and rear.

In a second embodiment, there are no slip pockets or D-shaped apertures made in the sleeves so that step is eliminated. The width of the sleeve is wider than the first embodiment to allow for punched holes in the sleeve which allow the sleeve to held in a binder, notebook or holder. Also, a third embodiment, not having slip pockets or D-shaped apertures, provides for two pockets formed in a single unit having one pocket directly over another pocket, each pocket also having a corresponding rear pocket. Holes are punched in the side of the sleeve for inserting the dual pocket sleeve embodiment into a binder, notebook or the like.

In another optional step the front web may be serially imprinted with matter such as the trademark or name of the manufacturer or supplier.

The next key step present in all embodiments is the separation for the slitting operation. In the first embodiment, because of the desirability of forming, in effect, four separate finished pockets, front and rear identifying matter pockets, the main CD holder pocket, and the rear descriptive matter holder pocket, the continuous front and rear webs are separated to define and provide ingress to these pockets and provide all four pockets.

Thus, the front and rear webs are separated into a continuous, somewhat narrow ribbon. Subsequent, in the first embodiment, the ribbon is formed to define the respective outer surfaces of the opposed front and rear slit pockets for the identifying matter. In the second and third embodiments, the ribbons will be substantially wider ribbons, substantially wider ribbons will be subsequently formed into the main CD holder pocket and the rear descriptive matter pocket, as will be described.

The first embodiment ribbon having the D-shaped apertures progresses substantially in contact with the inner fuzzy lamination. In all embodiments the front CD holder pocket ribbon proceeds to the forming station where it is die-cut. At the die-cutting station, the main CD holder ribbon is formed to the desired configuration. In the first embodiment, an angled thumb slot is desired in the resulting sleeve, so a continuous ribbon is cut having scallops to conform to this shape. In the first embodiment, this is accomplished in a cutting and then corner-rounding, or second cutting step; however, if appropriate, a single cutting operation could be utilized. In the second and third embodiments, the slot in the sleeve has more of a V-shape as opposed to a thumb shape.

Throughout this operation, the first and second embodiments form products in pairs, being aligned symmetrically about what will be their resulting bottom edge. Thus, the first embodiment resulting bottom edge is on the center line of the webs so described, the identifying matter slip pockets on the outer edges, thus at this slitting station, two outboard narrow ribbons are formed, a single die cuts the web for the thumb slot on the main CD pocket and, as will be described, only at the end are the finished CD holder sleeves separated. In the third alternative embodiment having dual pockets, the pockets are also formed in pairs, however the bottom of one pocket is adjacent to the top of the other pocket, and the pair of pockets are not separated. The second embodiment produces a single pocket version.

In the first embodiment, substantially simultaneously with the forming of the thumb slot in the main CD pocket, the rear descriptive matter pocket web is directed in registration with the inner fuzzy lamination, the formed main CD holder pocket web also brought into registration with the inner fuzzy lamination web. In the second and third embodiments, the rear descriptive matter pocket web and the inner fuzzy lamination are brought into registration, however, there are no ribbons in that there are no slip pockets in the second and third embodiments.

The respective webs are maintained under tension sufficient to keep them flat for the final operations.

In the three embodiments, the protective sleeve is thermally welded. In the first embodiment, a press having appropriately arrayed heating elements closes on the now-proximate webs and thermally welds them into a single unit, the previously described apertures, slits and slots forming the desired four pockets. In the second embodiment having holes for storing in a notebook and no identifying matter pockets a press having appropriately arrayed heating elements for that embodiment closes on the now-proximate webs and thermally welds them into a single forming two pockets. Also, in the third embodiment having holes for storing in a notebook, but not identifying pockets, and having two main CD holder pockets a press having appropriately arrayed heating elements for that embodiment closes on the now-proximate webs and thermally welds them into a single unit forming the desired four pockets. The polypropylene material in each aforesaid embodiment and all polypropylene structure is particularly adapted to be advantageously thermally welded. By comparison, vinyls, polyethylenes, and composites having different plastics in the various layers, can be welded through thermal welding or other methods, such as radio frequency or ultrasonic welding; however, the results have been less than satisfactory. The thermal welding used places welds some distance spaced inwardly from the edges providing a flange extending outwardly from the welds in the finished product. The paired configurations continue through the welding station and then pass to the next station. Next, the continuous webs having been welded, the first and third embodiments are now are now slit into two separate webs.

While being roll-feed during a continuous manufacturing operation, the longitudinal slit on the center line enables the continued feeding of the webs to the next station. The next step in the method is to form rounded corners by die-cutting opposed indexed concave V-shaped notches. In the first and second embodiments, the final step in the manufacturing process is to cut off the paired finished protective sleeves by use of a cut off blade aligned to cut off from the apexes of the previously described V-shaped slots. In the third embodiment having dual sleeves, obviously, there is no need for a final step of cutting off the paired sleeves. In the finished operation, a slightly rectangular compact disk holder having rounded corners and the previously described properties is formed.

BRIEF DESCRIPTION OF THE DRAWINGS

FIG. 2 is a perspective view of steps of the method of making the compact disk holder of the embodiment having label pockets.

FIG. 3 is a sectional view of the fuzzy lamination of the compact disk holder.

FIG. 4 is a perspective view of the front of a compact disk holder having top slit pockets.

FIG. 5 is a perspective view of the rear of a compact disk holder having top slit pockets.

FIG. 14 is a perspective view of the front of a compact disk holder in the second embodiment having binder holes therethrough.

FIG. 15 is a perspective view of the rear of a compact disk holder in the second embodiment having binder holes therethrough.

FIG. 16 is a perspective view of a compact disk holder in the second embodiment having binder holes therethrough with a compact disk in the main pocket.

FIG. 17 is a perspective view of the front of a compact disk holder in the third embodiment having dual sleeves and binder holes therethrough.

FIG. 18 is a perspective view of the rear of a compact disk holder in the third embodiment having dual sleeves and binder holes therethrough.

FIG. 19 is a perspective view of a compact disk holder in the third embodiment having dual sleeves with a compact disks in the main pockets.

DETAILED DESCRIPTION

Figure 1:
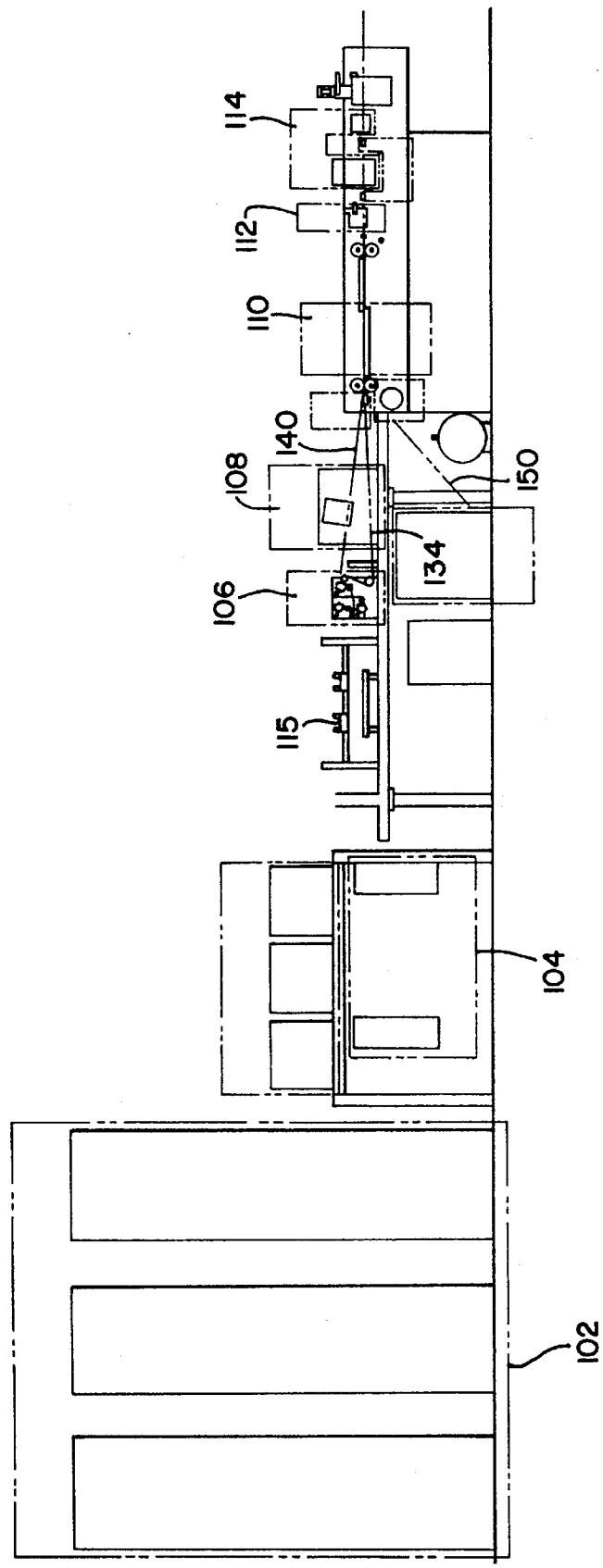
FIG. 1 is a schematic view of the method of manufacturing a compact disk holder.

A protective plastic sleeve 10 enables the storage of recorded media, primarily compact disks 12. Sleeve 10 has an inner fuzzy lamination 14 and front 16 and back 18 sheets. The front 16 and back 18 sheets are preferably cast non-glare polypropylene material. The inner fuzzy lamination 14 is formed from a fuzzy surface sheet 20 for contacting the protected surface 22, particularly the optical surface of a compact disk 12. This fuzzy surface sheet or film 20 is preferably white thermal bonded non-woven polypropylene fabric. Color is not, however, a feature of this invention. This material has been found to be sufficiently soft and has a surface finish flexible such as to not scratch the optical surface of a typical disk 12. Improved durability and strength is added by laminating, with an intermediate white extruded adhesive layer 24, to a cast clear polypropylene film substrate 26. The lamination 14 forms a 1.1 oz. per square yard thermal bonded polypropylene fabric laminated using 7 lbs. per ream of extended white polypropylene film 20 laminated to a 0.0025 inch clear cast polypropylene film 26.

FIGS. 4–7 show the general configuration of the holder as rectangular and is formed by first side 34, second side 36, top 38 and bottom 40 joining at rounded corners 42.

The sleeve or holder 10 is designed to retain item 12 in the main CD holder pocket 50 and to retain descriptive matter in the rear descriptive matter pocket 52. The main CD pocket 50 is formed of bonded side seams 54 and 56, seamed bottom 58 and top edge 60. Top edge 60 is further formed to define thumb slot 62. The combination of edge 60, slot 62 and fuzzy lamination 14 enable the user to fully protect the optical surface of the item or CD 12 by maintaining surface 22 against fuzzy lamination 14 while containing the CD in pocket 50. Slot 62 enables removal by use of thumb or finger pressure, while manipulating the CD and holder 10, avoiding the need to pinch the CD between thumb and finger to remove it, which could result in unwanted contact of the optical surface 22. Thus the CD 12 can be handled by contact on substantially only the opposed surface 64 and the CD edge 66.

On the holder or sleeve 10 face opposite the main pocket 50 is rear descriptive matter pocket 52. Rear pocket 52 is designed primarily for holding printed matter descriptive of the contents of the CD, such as album notes and lyrics which are commercially included with music CD's. These also frequently include graphic matter such as photographs of the artist and the album title.

A front label pocket 68 is shown for placement of identifying material such as labels to identify the contents of the compact disk are provided. This is a substantially long, narrow pocket formed from the front sheet, sealed or welded around its perimeter. A corresponding rear label pocket 70 is formed to a similar configuration.

Access to the label pockets is provided through a plurality of opposed "D-shaped" apertures 72. The shape provides both ease of insertion, which could also be provided by a simple slit, but also for ease of manual extraction for correction, changing, replacement, or the like. The D-shape provides for substantial friction between the user's fingertip and the surface of the label, avoiding the need for tools, or other difficult methods of removal of the identifying matter or label. The inner fuzzy lamination 14 with the front 16 and rear 18 sheets, defines two pockets. The identifying matter can be easily inserted by being placed against the inner fuzzy lamination for insertion. Having two separate pockets permits labels to be separately inserted front and rear.

The thermally welded configuration places all the weld seams, including the main pocket side seams 54 and 56 and bottom seam 58, as well as the label pocket upper seam 74, lower seam 76, label pocket first side seam 78 and second side seam 80, are spaced some distance inwardly from the perimeter edge 82 of the holder 10, providing a flange 84 extending outwardly from the welds in the finished product.

For improved durability stress point welds 86 and 88 are made at the top corners of main pocket 50. The use of homogenous plastic, such as all polypropylene in the preferred embodiment, in locations such as this provides much stronger welds.

In a second embodiment, as shown in FIGS. 14–16, the general configuration of the holder 270 as rectangular and is formed by first side 272, second side 274, top 276 and bottom 278 joining at rounded corners 280.

The sleeve or holder 270 is designed to retain item 12 in the main CD holder pocket 282 and retain descriptive matter in the rear descriptive matter pocket 284. The main CD pocket 282 is formed of bonded seam 286 and 288, seamed bottom 290, and top edge 292. Top edge 292 is further formed to define V-shaped slot 294. The combination of edge 292, slot 294 and fuzzy lamination 14 enable the user to fully protect the optical surface of the item or CD 12 by maintaining surface 22 against fuzzy lamination 14 while containing the CD in pocket 282. Slot 294 enables removal by use of thumb or finger pressure, while manipulating the CD 12 and holder 270, avoiding the need to pinch the CD 12 between thumb and finger to remove it, which could result in unwanted contact of the optical surface 22.

On the holder or sleeve 270 face opposite the main pocket 282 is rear descriptive matter pocket 284. Rear pocket 284 is designed primarily for holding printed matter descriptive of the contents of the CD.

This particular embodiment does not have label pockets, but does has a binding section 296 having binding holes 298 therein, for binding sleeve 270 in a notebook as seen in FIGS. 14–16. In a third embodiment, sleeve 270 takes the form of two interconnect sleeves 300 as seen in FIGS. 17–19. Both top and bottom sleeves 302, 304 share the same front, back and inner fuzzy lamination sheets. The bottom of top sleeve 302 is adjacent to the top of bottom sleeve 304.

Figure 6:
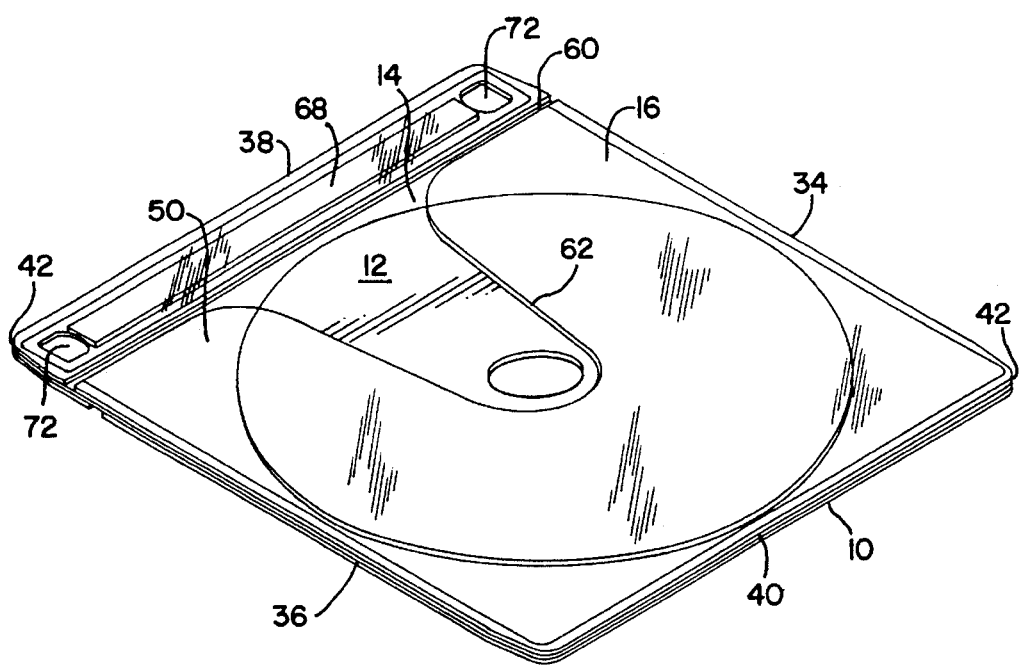
FIG. 6 is a perspective view of a compact disk holder with top slit pockets having a compact disk in the main pocket.
Figure 7:
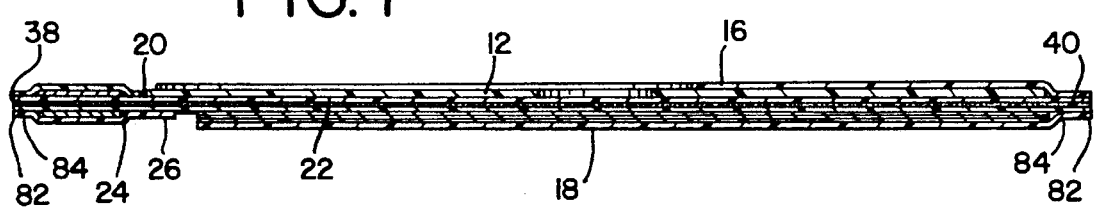
FIG. 7 is a sectional view of a compact disk holder having top slit pockets.

The fuzzy lamination forming step 100 (FIG. 8) forms the laminate 14 of the layers 20, 24 and 26 of webs, to be further described, and is done first, either off-site or on-site. FIG. 1 illustrates the steps in the method of manufacture. The second step is the web loading step 102. Third is the D-cutting step 104 for the embodiment having label pockets as seen in FIGS. 4–6. For the single and dual sleeve 270, 300 embodiments not the label pockets, no D-cutting step 104 is required. The next step is the ribbon slitting step 106. Next is the web die-cutting step 108. The next step is the thermal welding step 110. The next step is the longitudinal blank slitting step 112. Eighth is the finished holder corner rounding and cut off step 114. As will be described, in the preferred embodiment there are believed to be advantages in dividing the cutting steps 108 and 114 into separate substeps, cutting straight lines and rounding corners with separate tools. An optional printing step 115 can be done as desired, preferably between the D-shaped aperture cutting step 104 and the ribbon slitting step 106.

The fuzzy lamination forming step 100 is the first step in the method, and used to form lamination 14 as a continuous web 120. In step 100, substrate web 122 and fuzzy fabric web 124 are fed as continuous webs in proximity with one another one over and one under an extruder 126. The white opaque adhesive layer 128 is extruded as substrate web 122 and fabric web 124 are passed around the extrusion arrangement 126, and thence through suitable apparatus, such as rollers 130 and guides or platens 132, known in the plastic sheet forming art, compressing them with sufficient pressure for the adhesive to bond, but maintaining a temperature and pressure low enough to preserve the integrity of the fuzzy fabric web 124. In the preferred embodiment, rollers are used.

The term adhesive is used to differentiate this layer and describe its function in bonding the substrate 26 and fabric 20, however, it is to be understood that in the preferred embodiment, it is a layer of viscous polypropylene extruded in the appropriate state and location to form the bonding of the substrate 26 and fabric 20 into a single lamination web 134. As such it is essentially chemically the same as the fabric 20 and substrate, this homogeneity being an object of the invention.

Subsequent to the step 100 of forming the inner fuzzy lamination web 134, that lamination web is located in a position to be joined to the other webs or sheets. If formed off-site, as preferred, these can be stored, or otherwise handled for optimal manufacturing efficiency and economy.

The second step is the web loading step 102. This description relates to the preferred embodiment. Front lamination web 140 is fed in the method from one spool of web material 142 mounted on a first roll stand 144. A second spool of web material 146 is also mounted on first roll stand 144 so that an automatic splicing apparatus 148, known in the plastic sheet forming art, can feed webs continuously.

In like manner, back lamination web 150 is fed from one spool of back lamination web material 152 on a second roll stand 154. A second spool of back lamination web material 156 is also fed through an automatic splicing apparatus 148.

Intermediate the first 144 and second 154 roll stands is mounted one spool of web fuzzy material 160 on a third, or fuzzy material roll stand 162. A second spool of fuzzy web material 164 is also fed through an automatic splicing apparatus 148. Rollers or guides 166 are used to tension and direct each of the respective webs 134, 140 and 150 throughout the method.

While it is preferable to use continuous webs for manufacturing efficiency, so long as the finished laminations are maintained in appropriate position relative to one another, sheets having the properties described could be used. Once cut, of course, the web is effectively a sheet, and the material is sheet stock, whether in continuous web form, or some other form.

Throughout this operation, the first embodiment forms products in pairs, being aligned symmetrically about the web centerline at what will be their resulting bottom edge. Thus, the resulting bottom edge is on the center line of the webs so described, the identifying matter slip pockets on the outer edges The front lamination web 140 is preferably formed of 3.5 mil. matte polypropylene. This is a standard sheet stock familiar to persons of ordinary skill in the sheet forming art. The back lamination web 150 in the first embodiment also comprises standard 3.5 mil. matte finish polypropylene sheet.

All the webs, 140, 134 and 150, on their respective roll stands 144, 162 and 154 can be arranged to feed continuously, as by automatic splicing of a plurality of rolls. Stands 144, 162 and 154 can be located some distance from one another. Whatever desired plurality of rollers or guides 166 direct the webs 140, 134 and 150 into the appropriate positions, separated for operations such as die cutting and slitting the front 140 and back 150 and in registration where all the webs are to be processed alike.

As will be seen, where the front web 140 is imprinted, as in step 115, it is preferable for the web to be located on the top during the manufacturing process, for ease of readability of printed matter.

The third step 104 in the method of the first embodiment is to die-cut the D-shaped apertures 72. Both the front web 140 and rear web 150 have the apertures formed therein. This description will relate to one of the die-cut arrangements, there being one for each web 140, 150 desired, using front sheet die-set 170 and rear sheet die-set 172, respectively.

This step uses a punch 174 for each "D" shaped aperture mounted on punch frame 176. Die 178 is mounted on die frame 180, and punch frame reciprocates to cut web 140 which passes between punch 174 and die 178, being cut as the punch is inserted in the die. A pair of holes uses a pair of punch 174 and die 178 sets. The frames can be cycled pneumatically. Preferably, both the front and rear sheets are die-cut near the first 182 and second 184 web edges thereof in this step. As the paired sleeves are separated later, each web edge will become a top edge of a finished sleeve.

The method used to make the second and third embodiments for inserting into notebooks, as seen in FIGS. 14–19, does not include the step of die-cutting D-shaped apertures 72, since these embodiments do not possess label pockets.

In the first embodiment, webs 140 and 150 are each maintained separate from the inner fuzzy lamination web 134 because the inner fuzzy lamination defines the two label pockets, on the front 16 and rear 18, as described with reference to the product.

The three webs 134, 140 and 150 are then guided into proximity with one another to the next station for an optional step wherein the front web 140 is serially imprinted with matter such as a trademark, name of the manufacturer or supplier, inventory or bar code information, or the like. With a suitable backing, it would also be optional to imprint the front sheet 16 separate from the other webs, or as a finished product.

The fourth step in the first embodiment is the ribbon slitting step 106. Because of the desirability of forming, in effect, four separate finished pockets in the first embodiment, namely the front 68 and rear 70 label pockets, the main CD holder pocket 80, and the rear descriptive matter holder pocket 52, the continuous front and rear webs are separated to define and provide ingress to these pockets.

Webs 140 and 150 each are directed to cutter assembly 192 having two blades, of a configuration known in the sheet forming art. This separates each web 140, 150 to form a first edge ribbon 194 and second edge ribbon 196 at first edge 182 and second edge 184 respectively. The remaining portions of web 140 and web 150 are the main pocket web central portion 198 and rear pocket web central portion 200.

Ribbons 194 and 196 will be subsequently formed to define the respective outer surfaces of the opposed front and rear label pockets 68, 70. As pointed out, the webs in the preferred process are arranged to form two paired sleeves 10, separated by cutting at the end of the operation, so the tops thereof are oriented at the edges 182, 184.

The central portions 198 and 200 of the web 140 and the web 150, will be subsequently formed into the main CD holder pocket 50 and the rear descriptive matter pocket 52, respectively, when the entire product is formed and welded, and separated on the web centerline.

The ribbons 194 and 196 already have the D-shaped apertures 72 from step 104. These are guided to progress substantially in contact with the inner fuzzy lamination web 134, while the front main pocket web portion 198 proceeds to the forming station where it is die-cut in step 108.

IN the web die-cutting step 108, the main pocket web portion 198 is formed to the desired configuration. A frame 202 adjustably carries a die set 204 including a power pack. Various adjustment knobs 206 and threaded rods 208 permit adjustment in vertical and horizontal directions.

As discussed, an angled thumb slot 62 is desired in the resulting sleeve 10. To form this in the process, web portion 140 is cut in a manner such that scalloped edges 210 will conform to this final shape. Preferably, this is accomplished in a first cutting sub-step 212 with die set 204 and then a corner-rounding, or second cutting sub-step 214 with another die set. This has been found to generate straighter cuts and flatter material, using more economically made dies, however, if appropriate, a single cutting operation could be used.

Substantially simultaneously with the forming of the thumb slot 62 in the main CD pocket 50, the rear (lower) descriptive matter pocket web 150 divided into center portion 200 and ribbons is directed in registration with the inner fuzzy lamination web 134. The die cut portion 198 of main pocket (upper) web 140 is also brought into registration with the inner fuzzy lamination web 134.

The respective web 134, web portions 198 and 200, and ribbons 194 and 196, are maintained under tension by suitable tensioning mechanisms known in the plastic sheet forming art, sufficient to keep them flat for the final operations. The specific location and arrangement of the various guides and tensioners depends in large part on the specific mechanical choices such as the size and locations of the various roll stands, die sets and the like, and can be determined by one in the plastic sheet forming art.

Preferably, the protective sleeve is of homogenous plastic and can be advantageously thermally welded. In the next step 110, a press 220 having a plurality of heating elements, closes on the now-proximate webs. The label pocket heating element 222 main pocket side heating elements 224, main pocket bottom heating elements 226 and stress weld heating elements 228 form the weld seams, including the main pocket side seams 54 and 56 and bottom seam 58, as well as the label pocket upper seam 74, lower seam 76, label pocket first side seam 78 and second side seam 80, as described with respect to the finished holder 10.

In the next step for manufacturing the first embodiment seen in FIGS. 1–7, the longitudinal blank slitting step 112, the continuous webs having been welded, are now slit into two separate welded webs 230 and 232. The longitudinal slit 234 on the center line enables the continued feeding of the webs 230, 232 to the next station. The specific choice of the form of cutter 236 can be determined by one of ordinary skill in the plastic sheet forming art and may include straight, curved or rotating blades and suitable guides or dies. The embodiments seen in FIGS. 14–16 and 17–19 go through this longitudinal blank slitting step as well.

The next step in the method is the finished holder corner rounding and cut off step 114. In the first embodiment as seen in FIGS. 1–7, this includes the corner rounding sub-step 240 using die-set 242 to cut opposed and indexed concave V-shaped notches 244. This die set 242 is typical, having a top 246 and bottom 248 with leader pins 250 therebetween. Slide 252 moves on stand 254, cycling punch into die 258, the webs 230, 232 being captured therebetween and the notch 244 being formed thereby.

The final sub-step in manufacturing the first and second embodiments shown in figures 1–7 and 14–16 is the cut-off step 260. This sub-step cuts off the paired finished protective sleeves by use of a cut off blade 262 aligned to cut off from the apexes of the previously described V-shaped notches 244. Thus, in the finished operation, a slightly rectangular compact disk holder having rounded corners and the previously described properties is formed. This cut-off step is not needed for the embodiment shown in FIGS. 17–19, since this embodiment has integral dual sleeves.

In the second embodiment not having label pockets, but having binder holes therethrough for storing in a notebook, do not require the steps of forming ribbons 194 and 196, since these embodiments do not possess label pockets.

Figure 8:
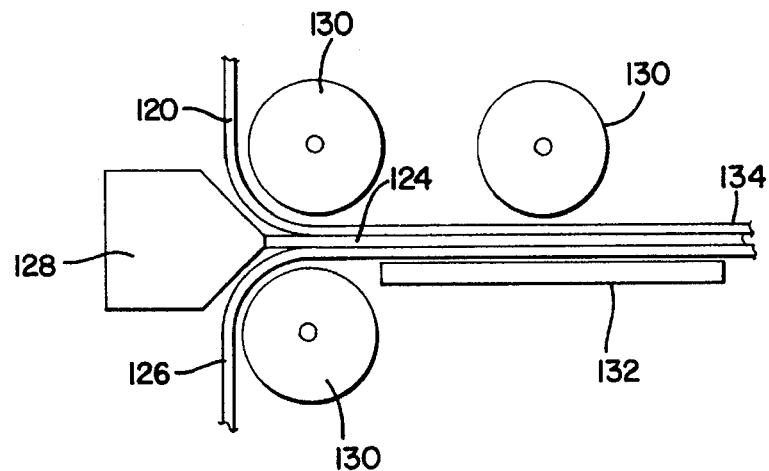
FIG. 8 is a sectional view of the fuzzy lamination of forming step in the method for manufacturing a compact disk holder.
Figure 9:
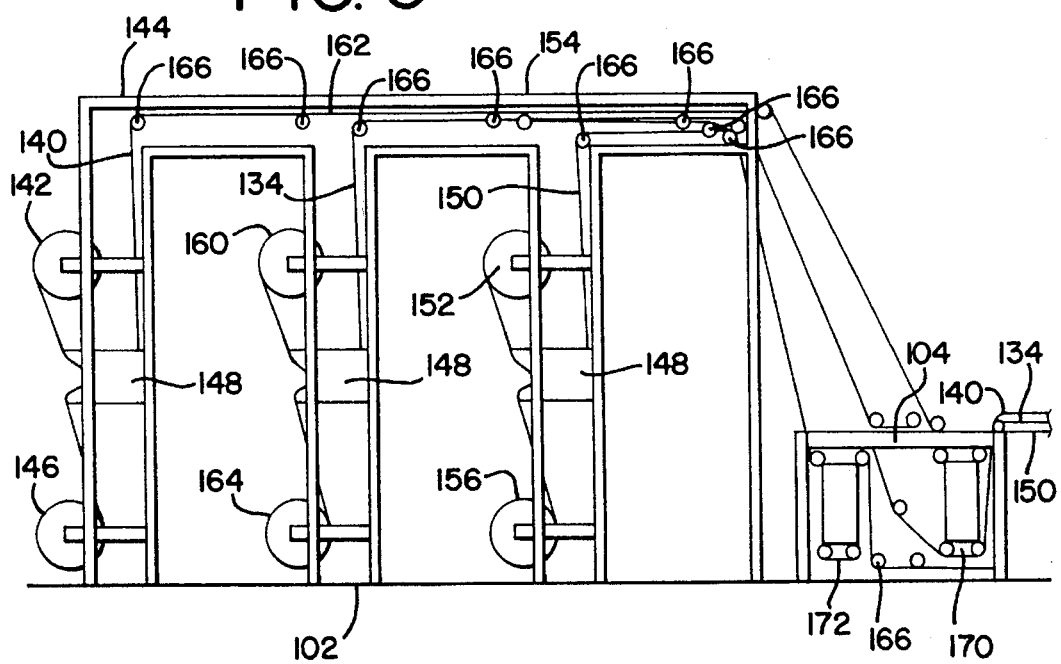
FIG. 9 is an elevational view of the rollstand arrangement of the method.
Figure 10:
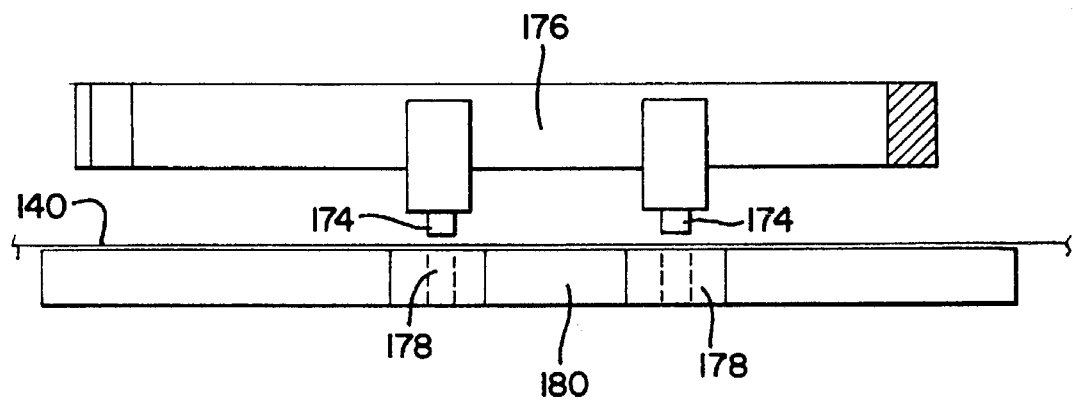
FIG. 10 is a sectional view of the D-shaped aperture forming step of the method.
Figure 11:
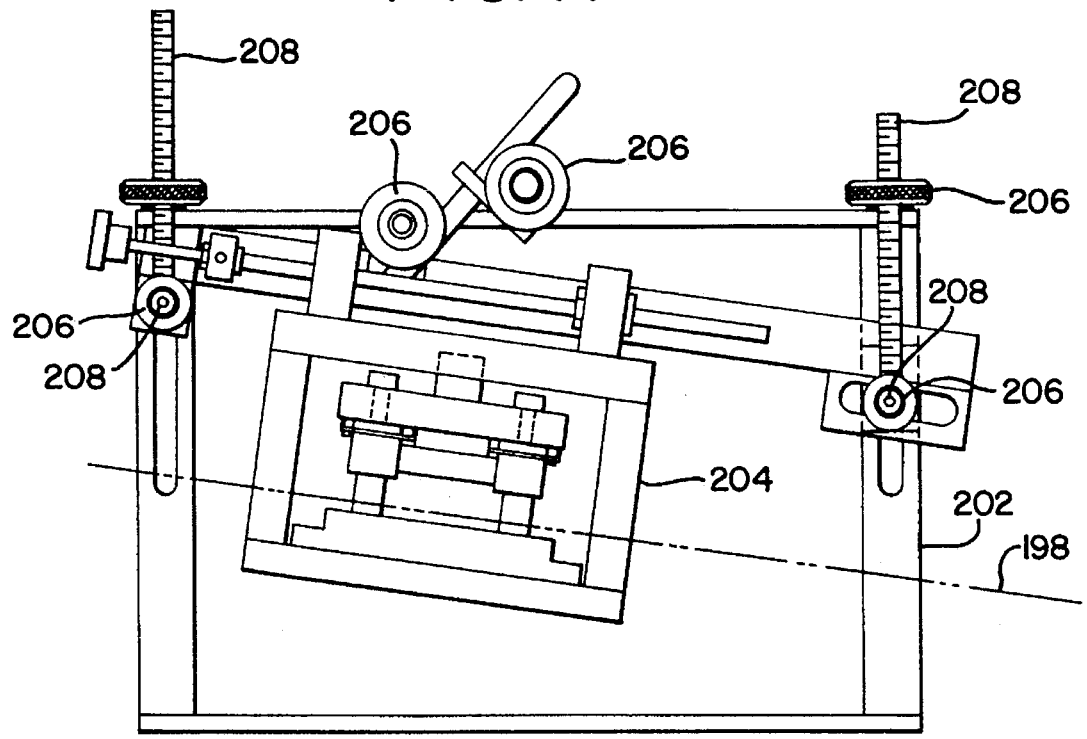
FIG. 11 is an elevational view of the web die-cutting step of the method.
Figure 12:
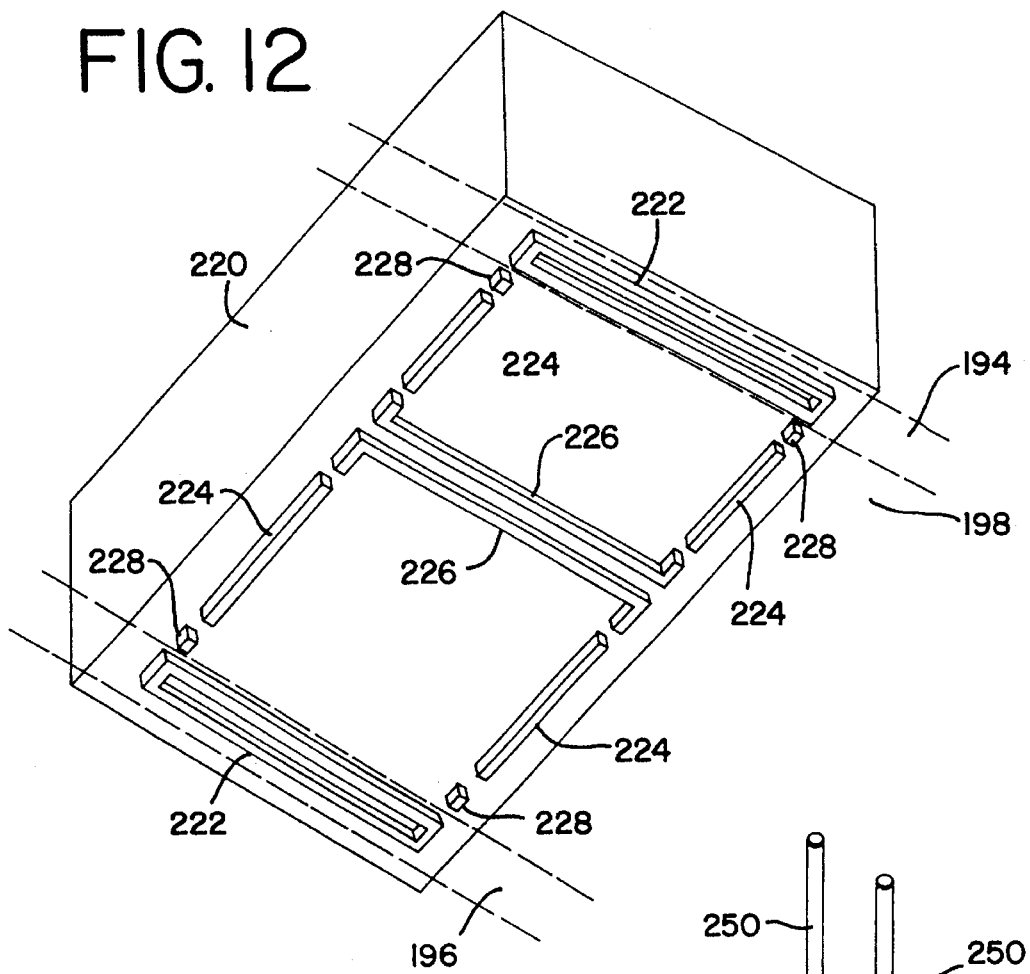
FIG. 12 is a perspective view of the welding step of the method for forming welds in a compact disk holder having top slit pockets.
Figure 13:
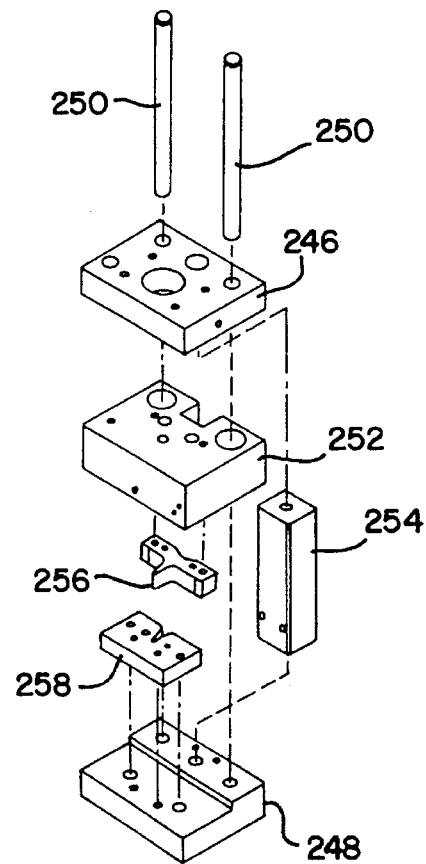
FIG. 13 is an exploded view of the corner rounding die set of the method.

The steps necessary for manufacturing the second embodiment includes a first step 100 of forming the fuzzy lamination (FIG. 8). FIG. 1 illustrates the steps in the method of manufacture. The second step is the web loading step 102. Third is the ribbon slitting step 106. Next is the web die-cutting step 108. The next step is the thermal welding step 110. The next step is the longitudinal blank slitting step 112. Seventh is the finished holder corner rounding, hole punch and cut off step 115.

Figure 22:
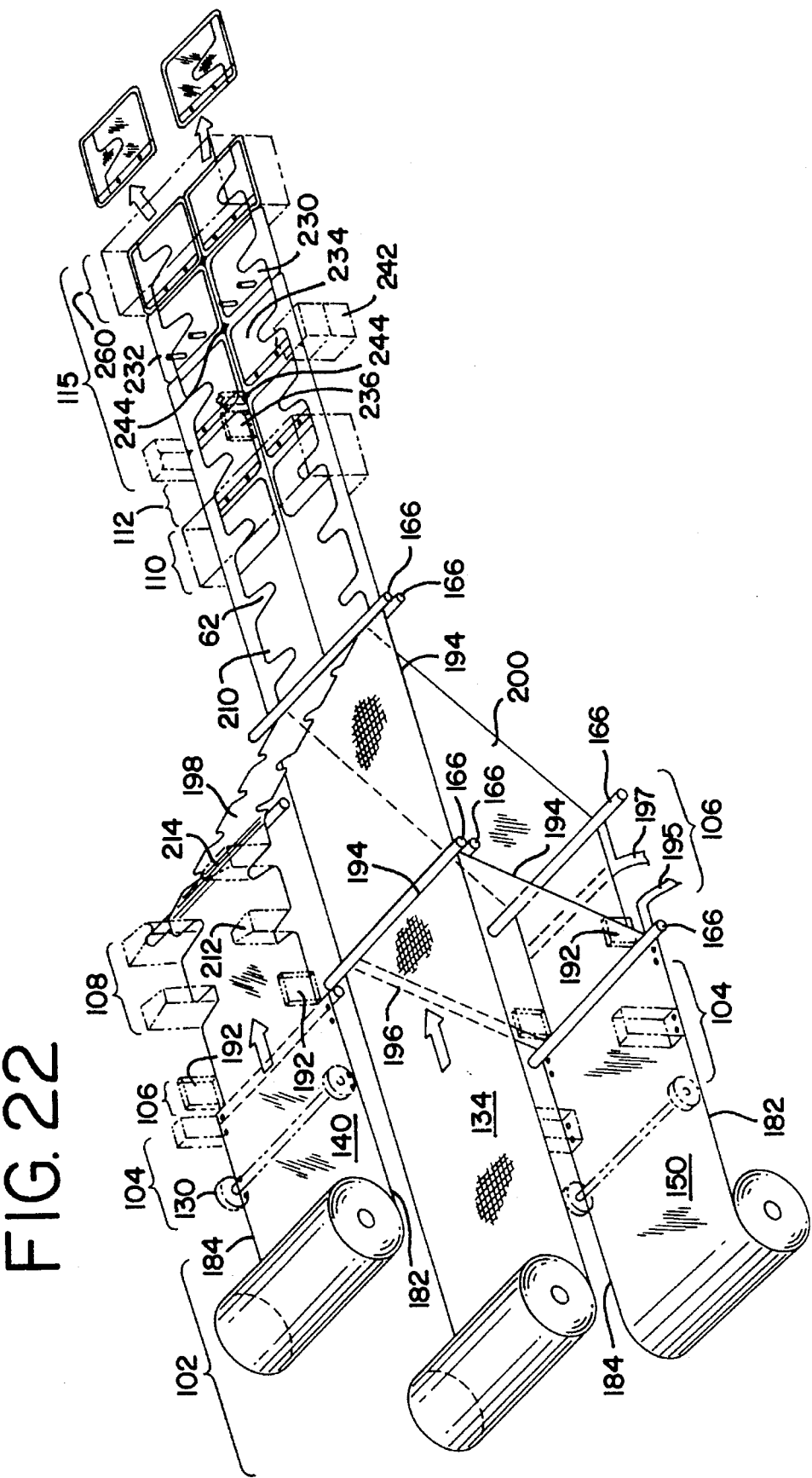
FIG. 22 a perspective view of steps of the method of making the compact disk holder of the third embodiment having dual pockets and holes therethrough for notebook insertion.

Because of the desirability of forming, in effect, two separate finished pockets in the second embodiment, namely the main CD holder pocket 282, and the rear descriptive matter holder pocket 284, the continuous front and rear webs are separated to define and provide ingress to these pockets as seen in FIG. 22.

Webs 140 and 150 each are directed to cutter assembly 192 having two blades, of a configuration known in the sheet forming art. This separates each web 140, 150 to form a first edge ribbon 195 and second edge ribbon 197 at first edge 182 and second edge 184 respectively. The remaining portions of web 140 and web 150 are the main pocket web central portion 198 and rear pocket web central portion 200.

The central portions 198 and 200 of the web 140 and the web 150, will be subsequently formed into the main CD holder pocket 50 and the rear descriptive matter pocket 52, respectively, when the entire product is formed and welded, and separated on the web centerline. Ribbons 195 and 197 are not needed and are disposed of.

The front main pocket web portion 198 proceeds to the forming station where it is die-cut in step 108. In the web die-cutting step 108, the main pocket web portion 198 is formed to the desired configuration. A frame 202 adjustably carries a die set 204 including a power pack. Various adjustment knobs 206 and threaded rods 208 permit adjustment in vertical and horizontal directions.

As discussed, an angled V-Shaped slot 294 is desired in the resulting sleeve 270. To form this in the process, web portion 140 is cut in a manner such that scalloped edges 210 will conform to this final shape. Preferably, this is accomplished in a first cutting sub-step 212 with die set 204 and then a corner-rounding, or second cutting sub-step 214 with another die set. This has been found to generate straighter cuts and flatter material, using more economically made dies, however, if appropriate, a single cutting operation could be used.

Substantially simultaneously with the forming of the V-Shaped slot 294 in the main CD pocket 282, the rear descriptive matter pocket web 150 cut into a center portion 200, is directed in registration with the inner fuzzy lamination web 134. The die cut center portion 198 of main pocket web 140 is also brought into registration with the inner fuzzy lamination web 134.

The respective web 134, web portions 198 and 200 are maintained under tension by suitable tensioning mechanisms known in the plastic sheet forming art, sufficient to keep them flat for the final operations. The specific location and arrangement of the various guides and tensioners depends in large part on the specific mechanical choices such as the size and locations of the various roll stands, die sets and the like, and can be determined by one in the plastic sheet forming art.

Figure 20:
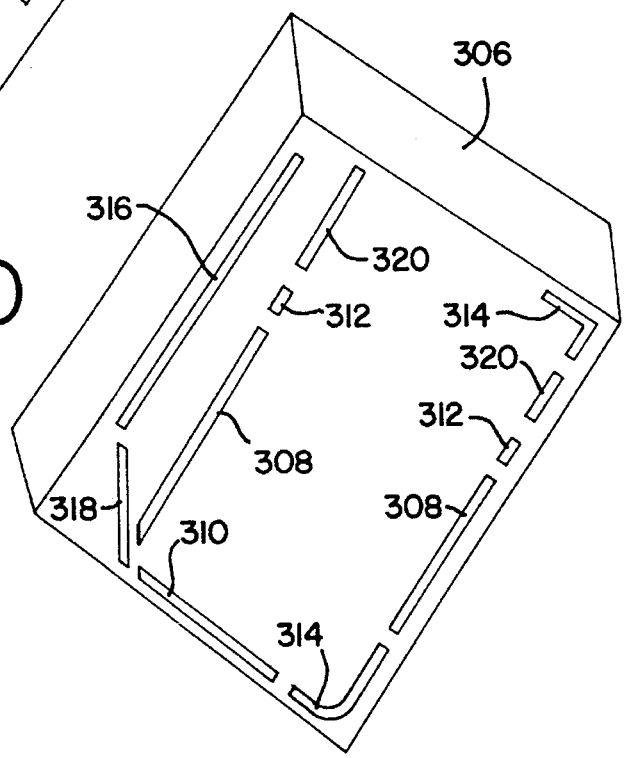
FIG. 20 is a perspective view of the welding step of the method for forming welds in a compact disk holder for the second embodiment having top slit pockets and holes for notebook insertion.

Preferably, the protective sleeve is of homogenous plastic and can be advantageously thermally welded. In the next step 110, a press 306 (FIG. 20) having a plurality of heating elements, closes on the now-proximate webs. Press 306 has main pocket side heating elements 308, main pocket bottom heating element 310, stress weld heating elements 312, main pocket corner heating elements 314, binder side heating element 316, corner binder heating element 318, and secondary side heating elements 320.

In the next step for manufacturing the second embodiment seen in FIGS. 14–16, the longitudinal blank slitting step 112, the continuous webs having been welded, are now slit into two separate welded webs 230 and 232. The longitudinal slit 234 on the center line enables the continued feeding of the webs 230, 232 to the next station. The specific choice of the form of cutter 236 can be determined by one of ordinary skill in the plastic sheet forming art and may include straight, curved or rotating blades and suitable guides or dies.

The next step in the method is the finished holder corner rounding, hole punching and cut off step 115. In the second embodiment, this includes the corner rounding sub-step 240 using die-set 242 to cut opposed and indexed concave V-shaped notches 244. This die set 242 is typical, having a top 246 and bottom 248 with leader pins 250 therebetween. Slide 252 moves on stand 254, cycling punch into die 258, the webs 230, 232 being captured therebetween and the notch 244 being formed thereby. Simultaneously during corner cutting, holes are punched through sleeve 270.

The final sub-step in manufacturing the embodiments shown in FIGS. 14–16 is the cut-off step 260. This sub-step cuts off the paired finished protective sleeves by use of a cut off blade 262 aligned to cut off from the apexes of the previously described V-shaped notches 244. Thus, in the finished operation, a slightly rectangular compact disk holder having rounded corners and the previously described properties is formed. This cut-off step is not needed for the third embodiment shown in FIGS. 17–19, since this embodiment has integral dual sleeves.

The steps necessary for manufacturing the third embodiment includes a first step 100 of forming the fuzzy lamination (FIG. 8). FIG. 1 illustrates the steps in the method of manufacture. The second step is the web loading step 102 (See FIG. 23). Third is the ribbon slitting step 106. Next is the web die-cutting step 108. The next step is the thermal welding step 110. The next step is the longitudinal blank slitting step 112. Seventh is the finished holder corner rounding and hole punch step 117.

Figure 23:
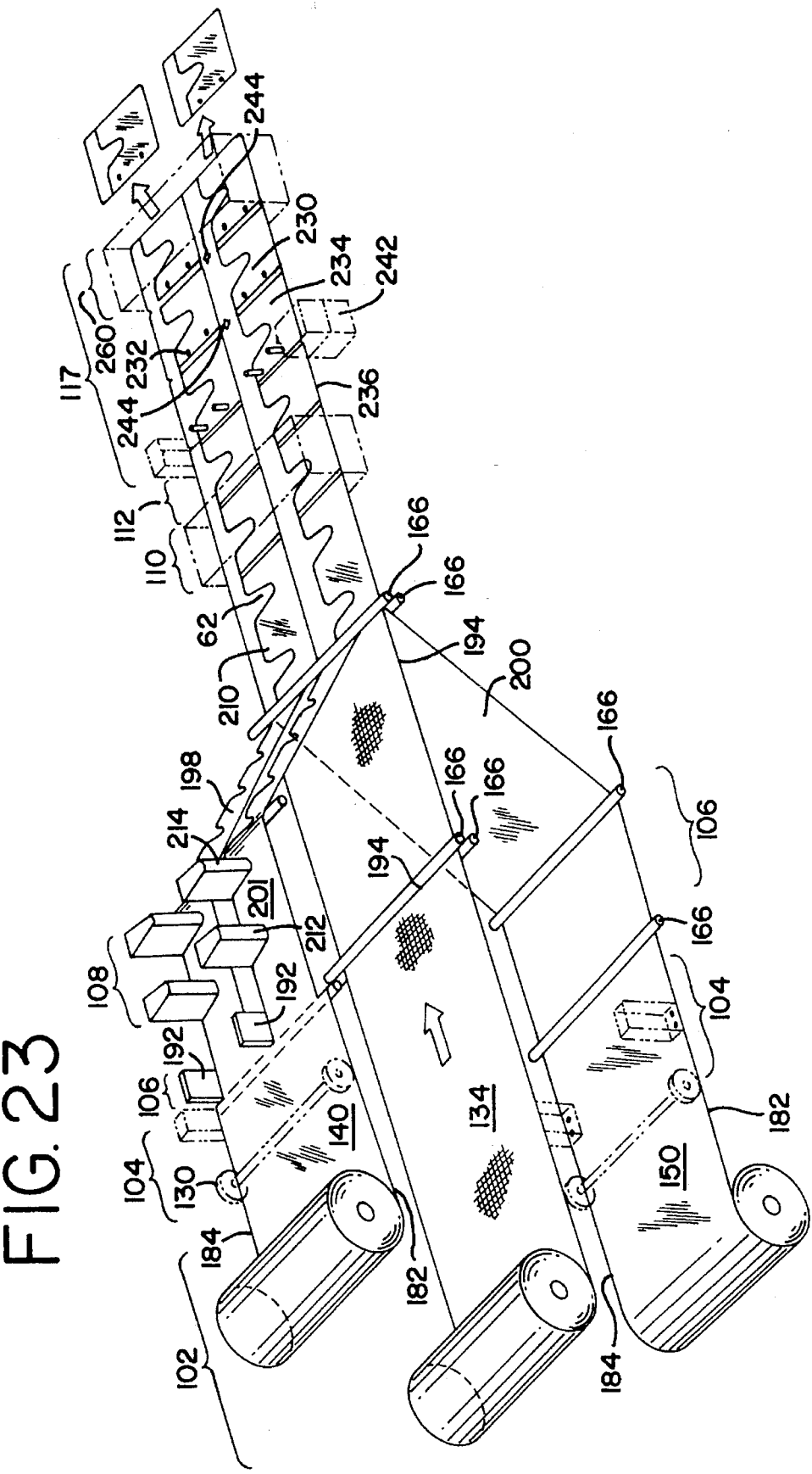
FIG. 23 a perspective view of steps of the method of making the compact disk holder of the second embodiment having dual pockets and holes therethrough for notebook insertion.
Figure 24:
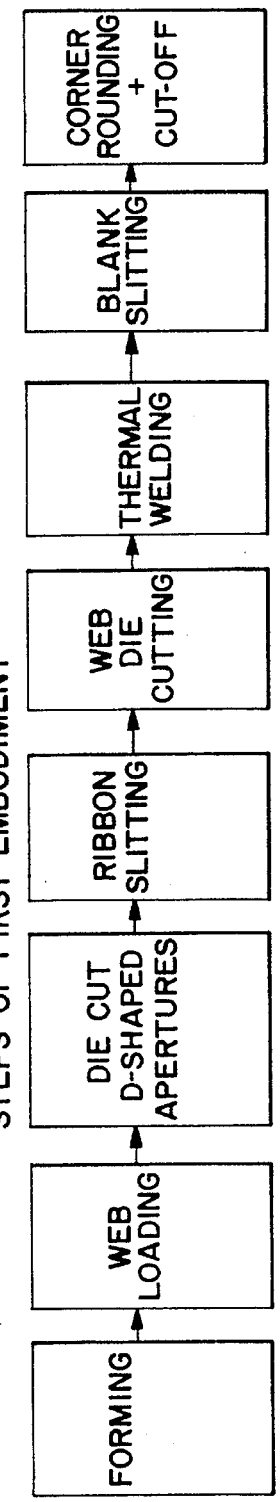
FIG. 24 is a flow chart of the method steps necessary for manufacturing the first embodiment of the compact disk holder.
Figure 25:
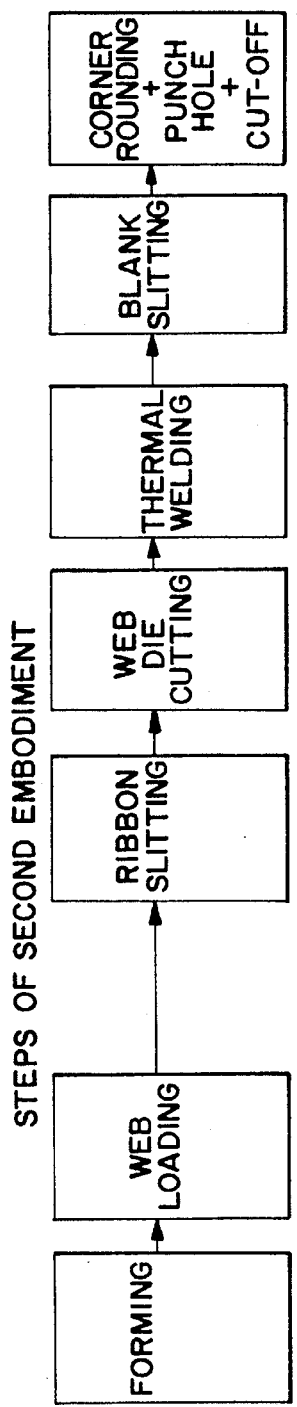
FIG. 25 is a flow chart of the method steps necessary for manufacturing the second embodiment of the compact disk holder.
Figure 26:
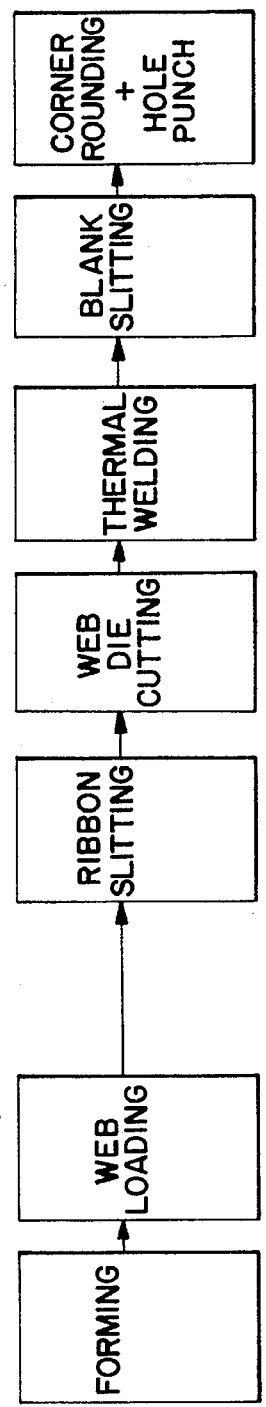
FIG. 26 is a flow chart of the method steps necessary for manufacturing the third embodiment of the compact disk holder.

Because of the desirability of forming, in effect, four separate finished pockets in the third embodiment (as seen in FIG. 17–18), namely the top main CD holder pocket 302, the bottom main CD holder pocket 304, the top rear descriptive matter holder pocket 306, and the bottom rear descriptive pocket 308, the continuous front and rear webs are separated to define and provide ingress to these pockets as seen in FIG. 23.

As seen in FIG. 23, web 140 is directed to cutter assembly 192 having three blades, of a configuration known in the sheet forming art. This separates web 140 to form a top main pocket portion 199 and a bottom main pocket portion 201 respectively.

The top and bottom main pocket portions 199 and 201 of the web 140 and the web 150, will be subsequently formed into the main CD holder pockets 302 and 304 and the rear descriptive matter pockets 306 and 308, respectively, when the entire product is formed and welded and slitted.

The top and bottom main pocket web portions 199 and 201 proceed to the forming station where it is die-cut in step 108. In the web die-cutting step 108, the top and bottom main pocket web portions 199 and 201 are formed to the desired configuration. A frame 202 adjustably carries a die set 204 including a power pack. Various adjustment knobs 206 and threaded rods 208 permit adjustment in vertical and horizontal directions.

Angled V-Shaped slots 306 and 308 are desired in the resulting sleeve 300. To form this in the process, web portion 140 is cut in a manner such that scalloped edges 210 will conform to this final shape. Preferably, this is accomplished in a first cutting sub-step 212 with die set 204 and then a corner-rounding, or second cutting sub-step 214 with another die set. This has been found to generate straighter cuts and flatter material, using more economically made dies, however, if appropriate, a single cutting operation could be used.

Substantially simultaneously with the forming of the V-Shaped slots 306 and 308 in the main CD pockets 302 and 304, the rear descriptive matter pockets web 150 is cut into top and bottom main body web portions 199 and 201, is directed in registration with the inner fuzzy lamination web 134. The die cut main body web portions 199 and 201 of main pocket web 140 is also brought into registration with the inner fuzzy lamination web 134.

The respective web 134, web portions 199, 201, and 200 are maintained under tension by suitable tensioning mechanisms known in the plastic sheet forming art, sufficient to keep them flat for the final operations. The specific location and arrangement of the various guides and tensioners depends in large part on the specific mechanical choices such as the size and locations of the various roll stands, die sets and the like, and can be determined by one in the plastic sheet forming art.

Figure 21:
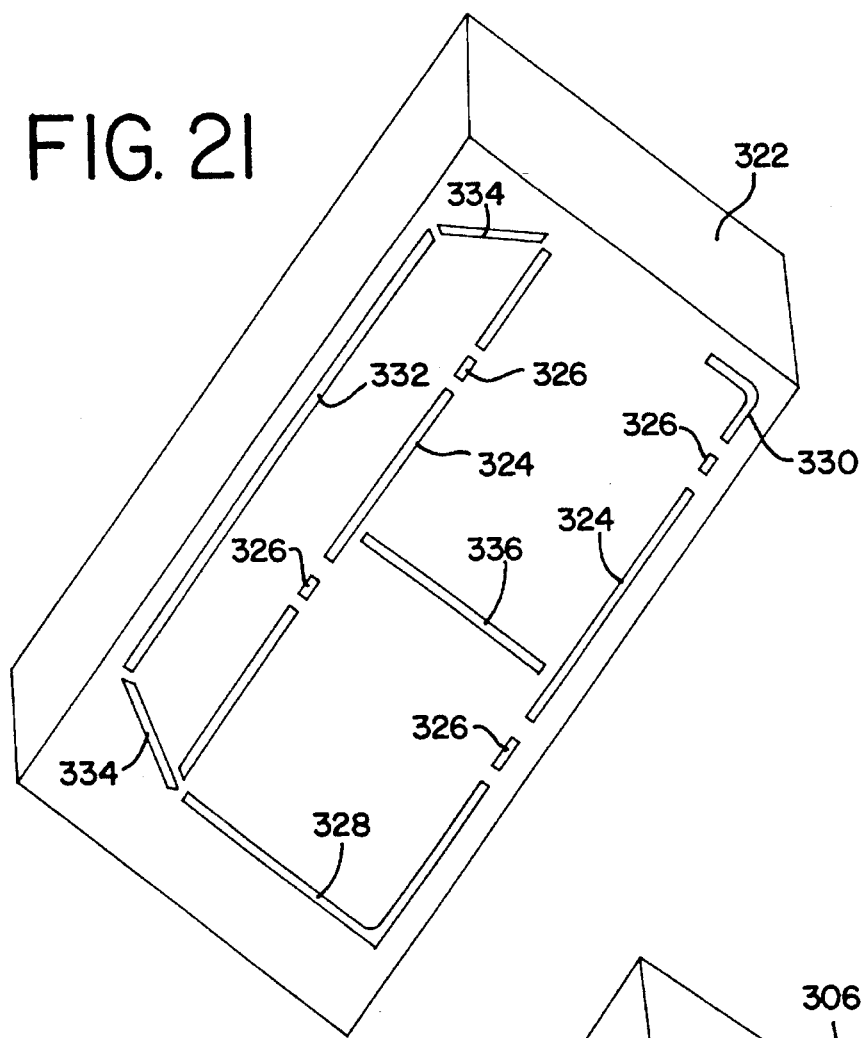
FIG. 21 is a perspective view of the welding step of the method for forming welds in a compact disk holder for the third embodiment having dual top slit pockets and holes for notebook insertion.

Preferably, the protective sleeve is of homogenous plastic and can be advantageously thermally welded. In the next step 110, a press 322 (FIG. 21) having a plurality of heating elements, closes on the now-proximate webs. Press 322 has main pocket side heating elements 324, stress weld elements 326, lower corner heating element 328, upper corner heating element 330, binder side heating element 332, corner binder elements 334, and center heating element 336. Press 322 has main pockets side heating elements 308, main pocket bottom heating element 310, stress weld heating elements 312, main pocket corner heating elements 314, binder side heating element 316, corner binder heating element 318, and second side heating elements 320.

In the next step for manufacturing the third embodiment seen in FIGS. 17–19, the longitudinal blank slitting step 112, the continuous webs having been welded, are now slit into two separate welded webs 230 and 232. The longitudinal slit 234 on the center line enables the continued feeding of the webs 230, 232 to the next station. The specific choice of the form of cutter 236 can be determined by one of ordinary skill in the plastic sheet forming art and may include straight, curved or rotating blades and suitable guides or dies. The next step in the method is the finished holder corner rounding and hole punching step 117. In the third embodiment, this includes the corner rounding sub-step 240 using die-set 242 to cut opposed and indexed concave V-shaped notches 244. This die set 242 is typical, having a top 246 and bottom 248 with leader pins 250 therebetween. Slide 252 moves on stand 254, cycling punch into die 258, the webs 230, 232 being captured therebetween and the notch 244 being formed thereby. Simultaneously during corner cutting, holes are punched through sleeve 270.

The third embodiment shown in FIGS. 17–19 does not have a cut-off step since both front pockets 302 and 304 are to be integral in the final product.

The all polypropylene structure is particularly adapted to be advantageously thermally welded. The paired configurations continue through the welding station and then pass to the next station.

I claim:

1. A protective sleeve for storage of a recording medium item comprising:

a front pocket forming sheet having the properties of transparency and stability so as to form a high quality compact disk pocket;

an inner fuzzy lamination sheet having the properties of fuzziness, softness and surfaces properties of flexibility so as to not scratch the surface of a compact disk for contacting said item said inner fuzzy lamination sheet including a thermal bonded polypropylene fabric sheet, an intermediate polypropylene adhesive layer and a clear polypropylene sheet, said thermal bonded polypropylene fabric sheet being laminated with said intermediate adhesive layer sheet to said clear polypropylene film sheet;

said front pocket forming sheet being thermally welded to said inner fuzzy lamination sheet along the perimetrical edges of the inner fuzzy lamination sheet, but not welded to at least one section along the perimetrical edges of the inner fuzzy lamination sheet, thereby creating a front pocket having a front opening for insertion of recording media between said front sheet and said inner fuzzy lamination sheet.

2. A protective sleeve in accordance to claim 1, wherein said sleeve has a least one hole therethrough for binding said sleeve in a notebook.

3. A protective sleeve in accordance to claim 2, wherein a second front pocket is integral with said protective sleeve.

4. A protective sleeve in accordance to claim 1, wherein the first sheet has a slot therein, said slot extending downward from the front opening.

5. A protective sleeve in accordance to claim 1, wherein a third sheet is joined by thermally welding said third sheet to the second sheet along the peripheral edges of the second sheet, but not joined to at least one section along the peripheral edges of the second sheet, said section being sufficient in size to allow insertion of recording media or graphics, thereby creating a back pocket having a back opening for insertion of recording media or graphics between the third and second sheet.

6. A protective sleeve for storage of a recording medium item comprising:

a front pocket forming sheet having the properties of transparency and stability so as to form a high quality compact disk pocket:

an inner fuzzy lamination sheet having the properties of fuzziness, softness and surface properties of flexibility so as to not scratch the surface of a compact disk for contacting said item, said front pocket forming sheet being thermally welded to said inner fuzzy lamination sheet along the perimetrical edges of the inner fuzzy lamination sheet, but not welded to at least one section along the perimetrical edges of the inner fuzzy lamination sheet, thereby creating a front pocket having a front opening for insertion of recording media between said front sheet and said inner fuzzy lamination sheet, and wherein the fuzzy lamination sheet is comprised of:

A. a substrate web;
   B. a fuzzy fabric web; and
   C. an adhesive layer, wherein the substrate web, the fuzzy fabric, adhesive layer and a third pocket forming sheet, also thermally welded thereto, are made of polypropylene.

7. A protective sleeve in accordance to claim 1, wherein a first channel like pocket is disposed next to said first sheet, said first channel like pocket being formed from said second sheet having a strip weld on at least two sides of said first channel like pocket.

8. A protective sleeve in accordance to claim 5, wherein said third sheet is welded to said second sheet around three perimetrical sides to form a second pocket.

9. A method of manufacturing a protective sleeve for storage of a recording medium item comprising the steps:

forming a fuzzy lamination of homogenous webs of material;

loading a plurality of webs including said fuzzy lamination web and at least a front web;

slitting said front web to form a ribbon and a main portion;

forming said portion to define a slot;

thermally welding said webs to one another to form a plurality of pockets and forming said webs into a substantially rectangular finished protective sleeve for storage of a recording medium item wherein the fuzzy lamination of homogeneous webs of material have been formed according to the steps of:

A. feeding as continuous webs in proximity with another a substrate web and a fuzzy fabric web;
   B. extruding an adhesive layer between said substrate and said fuzzy fabric web; and
   C. compressing said substrate web, said adhesive layer web, and said fuzzy fabric web together to bond said substrate web and said fuzzy fabric web together wherein the all the webs and the adhesive layer comprise a plastic material having substantially the same properties of strength and melting.

10. A method according to claim 9, wherein the back web is slit to form a ribbon and a main portion.

* * * * *